June 3, 1947.  H. TREVASKIS  2,421,728
HYDRAULIC BRAKE AND LIKE APPARATUS
Filed Jan. 4, 1946
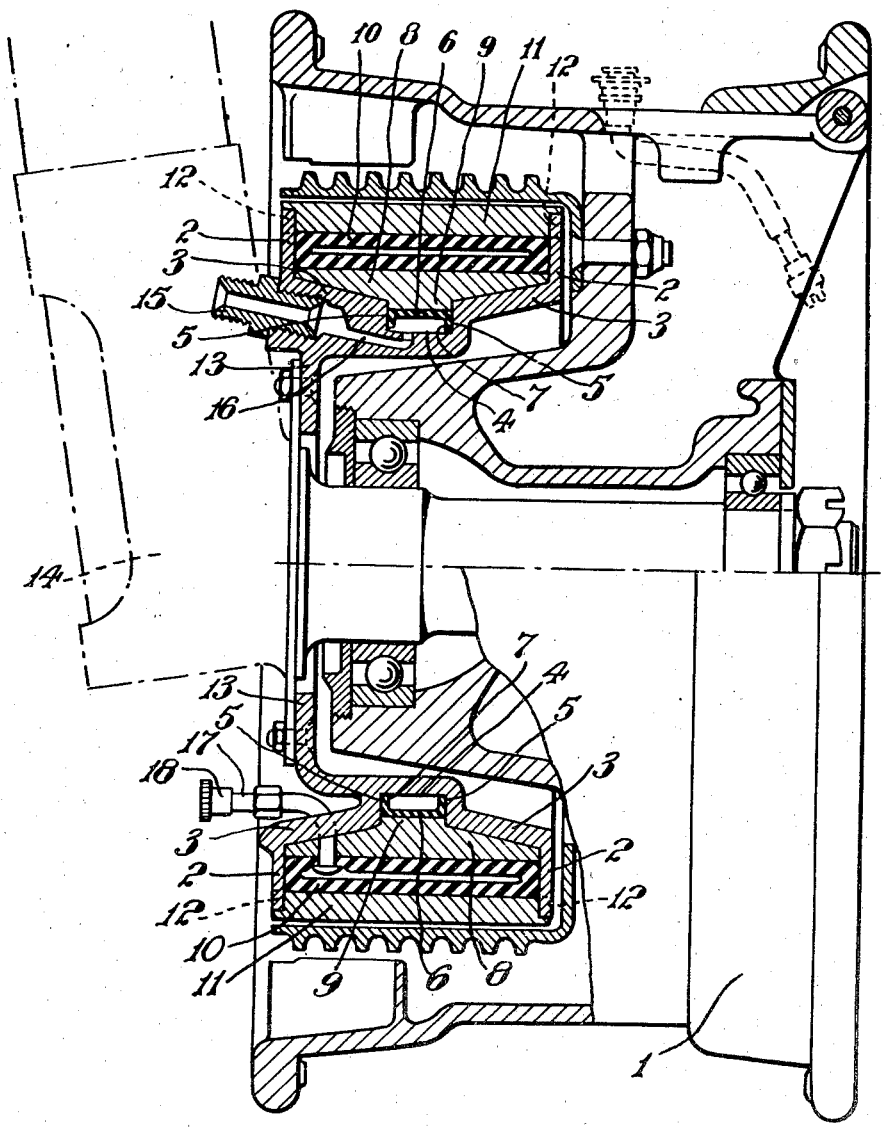

Patented June 3, 1947

2,421,728

UNITED STATES PATENT OFFICE 2,421,728

HYDRAULIC BRAKE AND LIKE APPARATUS

Henry Trevaskis, Birmingham, England, assignor to Dunlop Rubber Company Limited, London, England, a British company Application January 4, 1946, Serial No. 638,938
In Great Britain February 6, 1945

9 Claims. (Cl. 188—152)

My invention concerns improvements in or relating to wheel brake apparatus of the type having brake shoes movable radially of an annular member of channel section by an hydraulic packing expansible between the said shoes and the said annular member. Such packing when of a width corresponding to the shoes applies uniform pressure to the shoes and also allows the shoes a freedom of movement to a degree sufficient to permit their accommodation to the brake drum in the event of the distortion of the drum under the stresses and heat generated during the operation of the brakes.

The present invention has for its object to ensure a similar degree of accommodation between the shoes and the drum when the shoes are supported on thrust members which distribute pressure to the brake shoes from an hydraulic packing of narrow width relative to the shoes and expanded by fluid supplied to such packing at a high pressure.

According to this invention brake apparatus for a vehicle wheel comprises brake shoes movable towards the brake drum, an annular member for the location of the said brake shoes said member having a channelled recess in the centre thereof, an hydraulic packing located in the said channelled recess, a plurality of thrust members contiguous to the said hydraulic packing, and a distensible tube of resilient material having an inlet pipe said distensible tube being interposed between said thrust members and the said brake shoes.

In order that the invention may be more clearly understood and readily carried into practical effect, reference is made, in further describing the same, to the accompanying drawing showing a part sectional view of an aircraft wheel provided with brake apparatus constructed in accordance with the invention.

As shown in the drawing, the brake drum of an aircraft wheel 1 encircles an annular member 2 of channel section the base 3 of which is of shallow V formation and inclined in opposite directions to the side walls of the annular member and to a channelled recess 4 provided in the centre of its base. The channelled recess 4 has parallel vertical walls 5 between which is located a diametrically expansible hydraulic packing 6 of inverted channel section composed of rubber or like resilient material, the said packing having shallow side flanges 7 contacting the bottom of the channelled recess. The flanges of the hydraulic packing extend part way up in sliding contact with the walls of the channelled recess 4 and the outer periphery of the packing is contiguous to a plurality of thrust or pressure transmitting members 8 of a cross-section conforming to that of the base of the annular supporting member 2. The thrust members 8 each have a central projection 9 of square or rectangular section which slidably fits against the walls 5 of the channelled recess 4 and contact in a circumferential direction with the periphery of the hydraulic packing 6 the side flanges 7 of which form a sliding seal with the walls of the recess.

The peripheral surfaces of the thrust members 8 are substantially flat in an axial direction and contact the inner periphery of a distensible tube 10 which is of substantially rectangular section when deflated and extends across the whole width of the annular member 2. The tube 10 is preferably moulded of rubber or of rubber-like material. The outer periphery of the tube 10 contacts the bases of a multiplicity of brake shoes 11 which are located between the side walls of the annular member 2 and are prevented from circumferential movement relative thereto by lateral projections 12 which slide radially in contact with recesses provided at intervals in the walls of the annular member 2.

The annular member 2 may be cast integrally with an attachment flange or back plate 13 apertured for bolt attachment to a stub axle or like wheel carrying structure 14, and is provided with a union 15 connected to a channel 16 communicating with the base of the channelled recess 4 through which channel liquid may be supplied at the desired intensity of pressure to effect the diametral expansion of the hydraulic packing 6.

The tube 10 may be charged with oil, grease or other substantially incompressible fluid medium and may be provided with means such as a pipe 17 and non-return valve 18 adapted to retain such medium, the pipe 17 being preferably connected to the distensible tube 10 diametrically opposite the union 15 communicating with the expansible packing 6.

The distensible tube 10 provides a cushioning effect between the packing 6 and thrust members 8 and the brake shoes 11, and also provides a freedom of movement between the thrust members and the brake shoes that enables the brake shoes to adjust themselves to the surface of the brake drum.

Having described my invention, what I claim is:

1. Brake apparatus for a vehicle wheel, comprising brake shoes movable towards the brake drum, an annular member for the location of the said brake shoes said member having a channelled recess in the centre thereof, an hydraulic packing located in the said channelled recess, a plurality of thrust members contiguous to the said hydraulic packing, and a distensible tube of resilient material having an inlet pipe said distensible tube being interposed between said thrust members and the said brake shoes.

2. Brake apparatus as claimed in claim 1 wherein the said distensible tube is provided with a non-return valve.

3. Brake apparatus which comprises an annular member having a circumferential channel and an annular recess in the base of said channel, a hydraulic packing in said recess, a circumferential series of thrust members mounted about said hydraulic packing and movable radially by said packing, a stretchable distensible tube about said thrust members and a circumferential series of radially movable brake shoes on said tube.

4. Brake apparatus which comprises an annular member having a circumferential channel and an annular recess in the base of said channel, a hydraulic packing in said recess, a circumferential series of thrust members mounted about said hydraulic packing and movable radially by said packing, a distensible hollow annular tube of stretchable resilient material about said thrust members and a circumferential series of radially movable brake shoes on said tube.

5. Brake apparatus which comprises an annular member having a circumferential channel and an annular recess on the base of said channel, an annular hydraulic packing in said recess, said packing being of channel section to form a space in said recess and distensible in a radial direction, said recess having an inlet tube, a circumferential series of thrust members mounted about said hydraulic packing and movable radially by said packing, a distensible stretchable tube about said thrust members and a circumferential series of radially movable brake shoes on said tube.

6. The apparatus of claim 3 in which the base of said channel is inclined to said recess.

7. The apparatus of claim 3 in which said brake shoes and the walls of said channel have radially extending interlocking recesses and projections to permit said brake shoes to move radially and to prevent them from circumferential movement.

8. The apparatus of claim 3 in which said tube is of rubber composition.

9. The apparatus of claim 3 having a brake drum against which said brake shoes may press.

HENRY TREVASKIS.

REFERENCES CITED

The following references are of record in the file of this patent:

UNITED STATES PATENTS

| Number | Name | Date |
|---|---|---|
| 2,388,151 | Hunter | Oct. 30, 1945 |
| 2,390,311 | Kupiec et al. | Dec. 4, 1945 |